Patented Oct. 23, 1951

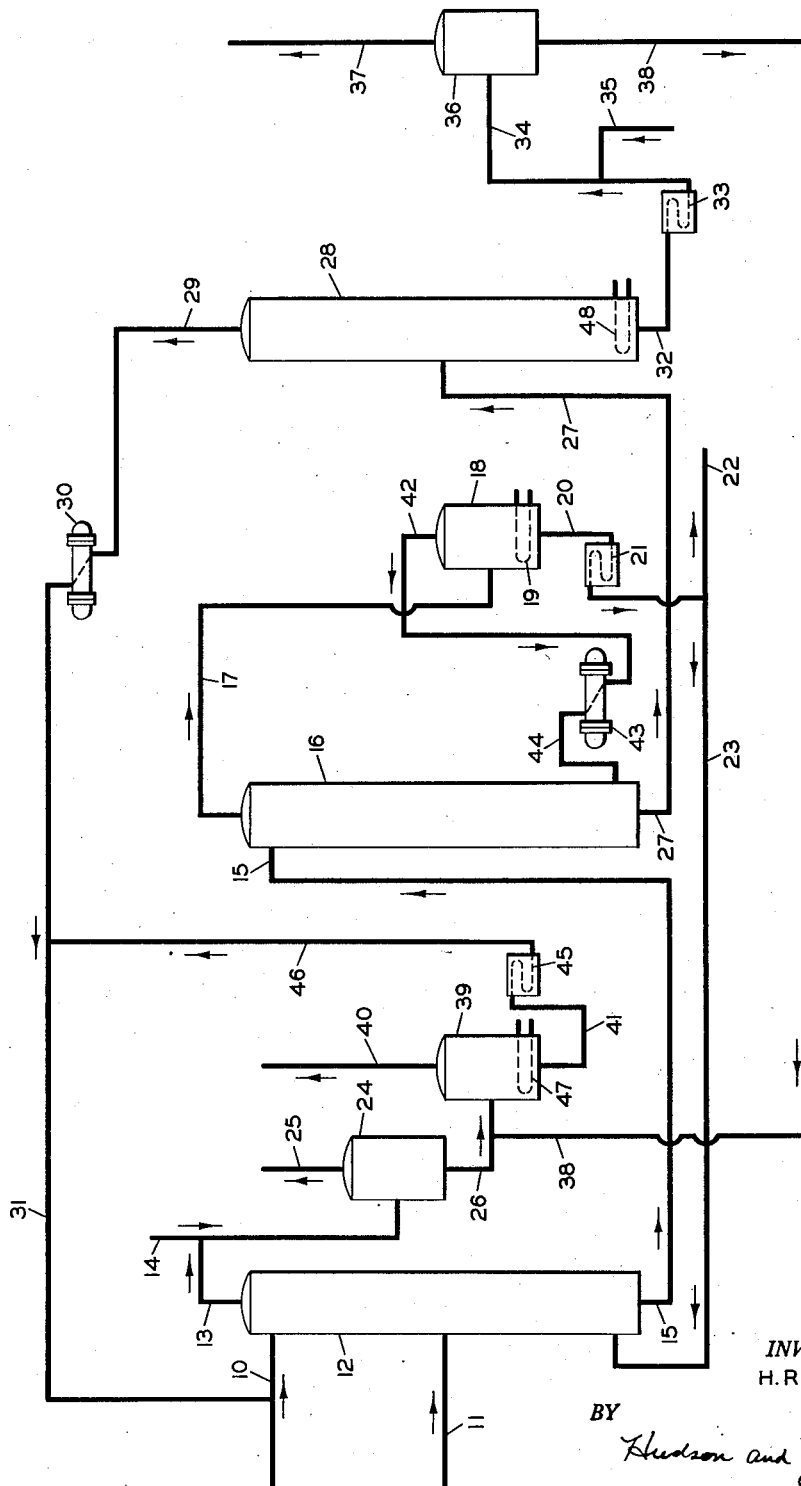

2,572,583

UNITED STATES PATENT OFFICE 2,572,583

IMPROVED LIQUID-LIQUID CONTACTING PROCESS USING DI(BETA-CYANOETHYL)-AMINE

Herbert R. Antle, Bartlesville, Okla., assignor to Phillips Petroleum Company, a corporation of Delaware Application December 21, 1948, Serial No. 66,556

6 Claims. (Cl. 196—14.15)

This invention relates to a solvent extraction process. In one of its more specific aspects it relates to an extraction process in which asphaltic materials and color bodies may be simultaneously extracted with the separation of one type of hydrocarbon compounds from a hydrocarbon mixture containing these materials.

The use of di(beta-cyanoethyl)-amine as a selective solvent is known. It is also known that this solvent selectively dissolves such materials as asphaltic materials and/or color-imparting materials from hydrocarbons containing them. This solvent has further application in the extraction of color bodies and/or asphaltic materials containing such hydrocarbon mixtures as crude oils, crude oil fractions, gas oils, and similar hydrocarbon products. My invention is concerned primarily with the simultaneous removal of asphaltic materials and/or color imparting materials and one type of hydrocarbon from mixtures of hydrocarbons containing this type of hydrocarbon and asphaltic and/or color imparting materials. The first stage of my process involves intimately contacting the di(beta-cyanoethyl)amine at suitable solvent to oil ratios and temperatures with such petroleum products as crude oil cuts or gas oil. The contacting operation may be carried out continuously in a countercurrent contacting tower, or in batch operation or by any other method of contacting. The amine solvent dissolves aromatic hydrocarbons and the asphaltic and/or color imparting materials. The second stage in the operation involves contacting of the extract phase with a secondary solvent, such as normal pentane, normal hexane, normal heptane, low boiling naphthenes or similar hydrocarbons. This secondary solvent extracts the aromatic hydrocarbon from the extract phase and rejects the amine solvent as a secondary raffinate. The asphaltic materials and color bodies remain in the amine phase. A third stage of my process consists in removing the asphaltic material and/or the color producing material from this amine phase. For this separation step I prefer to recover a portion of the amine by vacuum distillation of the amine phase and to recover the remainder of the amine by extraction of the vacuum still bottoms with water. The water and the dissolved solvent may then be easily separated from the rejected or precipitated asphaltic materials and the solvent recovered from the water by distillation. This method of amine recovery gives substantially complete recovery of the primary solvent whereas by vacuum distillation alone the conditions for substantially complete recovery of the solvent are so drastic that cracking sets in and causes considerable loss of the amine.

The figure illustrates diagrammatically one form of apparatus in which the process of my invention may be practiced.

The apparatus consists essentially of a liquid-liquid contacting vessel 12, a separator 24, a distillation means 39, a liquid-liquid contactor 16, a flash tank 18, a vacuum still 28, and a separator 36. These main pieces of apparatus are, of course, connected with conduits for transfer of material in process from one point to another. Several coolers or heat exchangers 45, 43, 33, 30 and 21 are provided for heating or cooling material in process, as desired.

In the operation of the process of my invention, the feed stock to be treated is conducted through a line 11 from a source, not shown, into contactor 12 at about a midpoint. Extraction liquid, i. e. di($\beta$-cyanoethyl)-amine, is introduced into the column through pipe 10 at a point near the top. Raffinate phase, which is the material which is insoluble in the solvent, leaves this vessel 12 at the top and is conducted through pipe 13 into the separator vessel 24. Since ordinarily the amount of solvent contained in the raffinate phase is relatively small, separation of the solvent is ordinarily not a difficult problem. Di(beta-cyanoethyl) amine is miscible with water in all proportions and accordingly, recovery of the amine from the raffinate may be effected merely by adding a sufficient amount of water from pipe 14 into the raffinate phase flowing in pipe 13. The hydrocarbon material from this raffinate phase then rises to the top of the separator vessel 24 and may be removed from the process through conduit 25 as one product of the process. The water solution of the amine settles to the bottom of the separator tank 24 and this solution may then be transferred through pipe 26 into the distillation means or vessel 39. A heating coil 47 in vessel 39 supplies sufficient heat for the distillation of the water from the amine. The separation of these two materials is not difficult since there is considerable spread in their boiling points. Bubble caps or other efficient packing material are not needed in separator 39. However, it is preferable to insert a number of baffles for preventing loss of entrained amine in the vaporous water or steam leaving the vessel through a conduit 40. The amine free from water then may be withdrawn from the bottom of this vessel through pipe 41, cooled in cooler 45 and passed on through conduits 46 and 31 into line 10 and thence into the contactor vessel 12.

The extract phase is withdrawn from vessel 12 through a line 15 and is passed into vessel 16 at a point near the top thereof. For exemplary purposes I will describe this step of my process as employing normal pentane as the secondary solvent. This solvent is introduced into column 16 through a pipe 44 near the bottom of the column. In this contactor the upward rising liquid pentane extracts the aromatic hydrocarbons from the amine phase which flows downward. Extract from the operation passes through a line 17 into a flash tank 18 in which the normal pentane is flashed overhead from the extracted aromatics. A heating coil 19 furnishes heat for this flashing step. The flashed pentane is passed through the pipe 42 and is condensed and cooled by condenser 43 while in transit to the extraction vessel 16. The aromatic-containing bottoms from the flash tank are withdrawn through pipe 20, cooled in cooler 21 and may be withdrawn from the system as the second product of the process through line 22. This product material may be passed to a storage tank or to other process step as desired. However, a portion of this aromatic material may be diverted from pipe 22 and passed through pipe 23 into the lower portion of the primary contacting vessel 12 to reflux the extract leaving vessel 12.

The raffinate phase which accumulates in the bottom of the secondary contactor 16 is withdrawn therefrom and is passed through conduit 27 into a vacuum still 28 at about a midpoint. A connection leading from this vacuum still 28 to vacuum pumps is not shown for purposes of simplicity since the construction and operation of vacuum stills and vacuum producing equipment are well known. That portion of the amine vaporized in still 28 under high vacuum conditions is passed through the overhead line 29 and is condensed in condenser 30 to a liquid which is then passed by way of conduit 31 to be introduced into line 10 and thence into the primary contactor 12. The vacuum distilled bottoms which contains a considerable proportion of amine along with the asphaltic and/or color body material is passed through conduit 32, cooler 33 and on through conduit 34 to the separator 36 at about a midpoint. Liquid water from a source, not shown, is injected into this vacuum still bottoms through conduit 35. Sufficient water is added at this point to dissolve the amine and to precipitate the asphaltic and color body material. Since the asphaltic and color body material is precipitated as solid material, the separator 36 may include a filter press or decanter or other separating means whereby such material may be separated from the aqueous amine solution. Conduit 37 is intended to be a means for the passage of the precipitated material from the separator to a storage tank or other disposal, as desired. The aqueous amine solution is passed from the separation means 36 through line 38 into the material in transit in pipe 26. The combined material is then passed into the distillation means 39, the operation of which has been discussed hereinbefore. The water originating from separator 36 and 24 (pipes 14 and 35) then passes through the conduit 40 to such disposal as desired while the amine leaves the separation means 39 through conduit 41, is cooled in cooler 45 and passes on through conduits 46, 31 and 10 as recycle solvent to the primary extractor.

The primary extraction operation may be carried out at temperatures within the range of about 75° F. to 200° F., preferably between 100° F. and 150° F. Pressure of this operation may be atmospheric or at a pressure sufficiently high to maintain all materials in process in the liquid phase. The secondary extraction step may be carried out at such pressure as will be required to maintain the secondary solvent in the liquid phase. It will be obvious that when normal heptane is used as a secondary solvent, lower pressures may be used than when using normal pentane as the secondary solvent. Since normal pentane boils at about 99° F. sufficient pressure will need be maintained at this step to keep the pentane in liquid phase at all times.

The vacuum still may be operated at a pressure within the approximate limits of 0.1 to 5 mm. The operation of this column is preferably such that from 20 to 90 per cent by weight, and more preferably 50 to 90 per cent, of the amine distills overhead. As mentioned hereinbefore, a substantial proportion of the amine should be permitted to remain in the liquid bottoms since if the bottoms are heated to a sufficiently high temperature to take all the amine overhead, considerable decomposition of the amine occurs and, of course, such decomposition incurs loss of the primary solvent. The fractionator or separator 39 may be operated at a temperature between approximately 220° F. and 250° F. for removal of the water from the amine. At this relatively low temperature decomposition of the amine does not take place.

One particular advantage of my process over prior art methods is that the asphaltic and color body material precipitated by the water from line 35 is easily and completely separated in separator 36. When diluting the entire quantity of solvent flowing through line 27 with water as in the prior art an emulsion was produced from which asphalt and color body material was not easily recovered. The emulsion appeared to be quite stable. Thus, by removing a portion of the di(beta-cyanoethyl) amine by vacuum distillation the remaining solution, I have found, is in condition for easy and complete asphalt precipitation by addition of water.

The extract phase in line 15 from the primary extractor contains extracted hydrocarbons, amine, and asphaltic and color body material and also forms an emulsion upon addition of water as above mentioned in relation to the solvent-asphalt-color body material flowing through line 27. Thus an emulsion is formed regardless of the extracted hydrocarbon content of the amine solution.

*Specific example*

Primary Solvent—di - (beta-cyanoethyl) - amine
Feed—thermally cracked gas oil having a furfural point of 204° F. and a carbon residue off 0.14%
Extraction temperature—140° F.
Pressure—atmospheric
Solvent to oil ratio, by weight—2: 1
Primary raffinate—furfural point 217° F., carbon residue 0.14%
Secondary solvent—n-pentane
Secondary extract—furfural point 28.4° F., carbon residue 0.52%
Vacuum still—temperature 160° F. at 2 mm. abs. pressure, 75% of the amine in bottoms
Vacuum still bottoms water added and asphaltic material recovered by filtration.

In the above described example, a thermally cracked gas oil having a furfural point of 204° F.

was treated according to the process of my invention. The primary solvent was di-(beta-cyanoethyl)-amine and the secondary solvent was normal heptane. The primary raffinate recovered had a furfural point of 217° F. This furfural point was 13° higher than the furfural point of the feed stock indicating that the paraffinicity of this raffinate product had been increased. The extract from the secondary extraction operation had a furfural point of 28.4° F. This very low furfural point is, of course, an indication of relatively high aromaticity. In the vacuum still step for recovery of the solvent 75% of the amine was allowed to remain in the bottoms and from this bottoms product was recovered by precipitation some asphaltic material which was recovered from the aqueous amine solution by filtration.

Such auxiliary equipment as pumps, valves, temperature and pressure measuring and recording equipment, flow meters and flow controlling equipment and the like are not shown for purposes of simplicity since the installation and use of such equipment is well understood by those skilled in the art. It will be obvious that many variations and alterations in my process may be made, such as for example, all or only a part of the aromatic material from the flash tank 18 may be passed through conduit 22 as the product of the process or a part thereof may be recycled through the line 23 to reflux the extract leaving the primary contactor 12. The particular temperatures of operation of the contactors 12 and 16 may be chosen within the limits given depending upon the extracts to be made and the degree of the extractions desired. Also the ratio of amine to the charge stock in the primary contactor may be varied for the particular purpose at hand. Likewise the ratio of the secondary solvent to the primary extract in contactor 16 may be varied depending upon the extraction desired.

It will be obvious to those skilled in the art that many variations and alterations in the operation of my process may be made and yet remain within the intended spirit and scope of my invention.

Having disclosed my invention, I claim:

1. A process for the separation of one type of hydrocarbon and of asphaltic and color body material from a mixture containing these and another type of hydrocarbon as separate products comprising treating such a mixture of hydrocarbons with di(beta-cyanoethyl)-amine as a first selective solvent under conditions to form a first raffinate phase and first extract phase, separating these phases, extracting with water the dissolved first solvent from the hydrocarbon of the first raffinate phase and recovering this separated hydrocarbon free from said one type of hydrocarbon and asphaltic and color body materials as one product of the process; treating the first extract phase with a second selective solvent having a preferential selectivity for said one type of hydrocarbon under conditions to form a raffinate phase and an extract phase, separating this latter raffinate phase as the second raffinate phase and this latter extract phase as the second extract phase, separating said one type of hydrocarbon from the selective solvent of said second extract phase, recovering said separated one type of hydrocarbon as a second product of the process and recycling said separated selective solvent into the second treating step as said second selective solvent; vacuum distilling a portion of the dissolved first solvent from said second raffinate phase, extracting with water the first solvent from the vacuum distillation bottoms and recovering this extraction residue as a separated asphaltic and color body third product of the process; combining the two aqueous solutions of first solvent, recovering solvent therefrom, adding the vacuum distilled first solvent and recycling this combined first solvent as the first selective solvent into the original treating step.

2. The process of claim 1 wherein the one type of hydrocarbon separated is the aromatic type of hydrocarbon.

3. In the process of claim 1 wherein the second solvent is a n-paraffinic hydrocarbon selected from the group consisting of n-pentane, n-hexane, and n-heptane.

4. A process for the separation of one type of hydrocarbon and of asphaltic and color body material from a mixture containing these and another type of hydrocarbon as separate products comprising treating such a mixture of hydrocarbons with di(beta-cyanoethyl)-amine as a first selective solvent under conditions to form a first raffinate phase and a first extract phase, separating these phases, extracting with water the dissolved first solvent from the hydrocarbon of said first raffinate phase and recovering this separated hydrocarbon free from said one type of hydrocarbon and asphaltic and color body material as one product of the process; treating said first extract phase with a second selective solvent having a preferential selectivity for said one type hydrocarbon under conditions to form a raffinate phase and an extract phase, separating this latter raffinate phase as the second raffinate phase and this latter extract phase as the second extract phase, separating said one type of hydrocarbon from the selective solvent of said second extract phase, recovering said separated one type of hydrocarbon as a second product of the process and recycling said separated selective solvent into the second treating step as said second selective solvent; vacuum distilling a portion of the dissolved first solvent from said second raffinate phase, extracting with water the first solvent from the vacuum distillation bottoms and recovering this extraction residue as the separated asphaltic and color body third product of the process; combining the two aqueous solutions of first solvent, recovering solvent therefrom, adding the vacuum distilled first solvent and recycling this combined first solvent as the first selective solvent into the original treating step, and recycling a portion of the recovered one type of hydrocarbon as reflux to the original treating step at a point near the point of withdrawal of the first extract phase.

5. A process for the separation of one type of hydrocarbon and of asphaltic and color body material from a mixture containing these and another type of hydrocarbon as separate products comprising treating such a mixture of hydrocarbons with di(beta-cyanoethyl)-amine as a first selective solvent under conditions to form a first raffinate phase and a first extract phase, separating these phases, extracting with water the dissolved first solvent from the hydrocarbon of said first raffinate phase and recovering this separated hydrocarbon free from said one type of hydrocarbon and asphaltic and color body material as one product of the process; treating said first extract phase with a second selective solvent having a preferential selectivity for said one type hydrocarbon under conditions to form a raffinate phase and an extract phase, separating this latter raffinate phase as the second raffinate phase and this latter extract phase as the second extract phase, separating said one type of hydrocarbon from the selective solvent of said second extract phase, recovering said separated one type of hydrocarbon as a second product of the process and recycling said separated selective solvent into the second treating step as said second selective solvent; vacuum distilling a portion of the dissolved first solvent from said second raffinate phase, extracting with water the first solvent from the vacuum distillation bottoms and recovering this extraction residue as a separated asphaltic and color body third product of the process; combining the two aqueous solutions of first solvent, recovering solvent therefrom, adding the vacuum distilled first solvent and recycling this combined first solvent as the first selective solvent into the original treating step, and operating the first extraction step between the temperature limits of 75° and 200° F. and the second extraction step between the temperature limits of 50° and 200° F.

6. A process for the separation of one type of hydrocarbon and of asphaltic and color body material from a mixture containing these and another type of hydrocarbon as separate products comprising treating such a mixture of hydrocarbons with di(beta-cyanoethyl)-amine as a first selective solvent under conditions to form a first raffinate phase and a first extract phase, separating these phases, extracting with water the dissolved first solvent from the hydrocarbon of said first raffinate phase and recovering this separated hydrocarbon free from said one type of hydrocarbon and asphaltic and color body material as one product of the process; treating said first extract phase with a second selective solvent having a preferential selectivity for said one type hydrocarbon under conditions to form a raffinate phase and an extract phase, separating this latter raffinate phase as the second raffinate phase and this latter extract phase as the second extract phase, separating said one type of hydrocarbon from the selective solvent of said second extract phase, recovering said separated one type of hydrocarbon as a second product of the process and recycling said separated selective solvent into the second treating step as said second selective solvent; vacuum distilling a portion of the dissolved first solvent from said second raffinate phase, extracting with water the first solvent from the vacuum distillation bottoms and recovering this extraction residue as a separated asphaltic and color body third product of the process; combining the two aqueous solutions of first solvent, recovering solvent therefrom, adding the vacuum distilled first solvent and recycling this combined first solvent as the first selective solvent into the original treating step, and wherein the secondary solvent is such a hydrocarbon as will selectively dissolve said one class of hydrocarbon to the exclusion of said first selective solvent and the asphaltic and color body material, and operating the first and second extraction steps between the temperature limits of 75° to 200° F., and 50° to 200° F., respectively.

HERBERT R. ANTLE.

REFERENCES CITED

The following references are of record in the file of this patent:

UNITED STATES PATENTS

| Number | Name | Date |
| --- | --- | --- |
| 2,079,886 | Voorhees | May 11, 1937 |
| 2,106,234 | Bray | Jan. 25, 1938 |
| 2,114,524 | Egli | Apr. 19, 1938 |
| 2,138,832 | Brown et al. | Dec. 6, 1938 |
| 2,163,245 | Laughlin | June 20, 1939 |
| 2,246,297 | Duncan et al. | June 19, 1941 |
| 2,419,039 | Scarth | Apr. 15, 1947 |
| 2,439,534 | Wilkes | Apr. 13, 1948 |
| 2,447,404 | Furby | Aug. 17, 1948 |